(12) United States Patent
Somhorst et al.

(10) Patent No.: US 10,151,231 B2
(45) Date of Patent: Dec. 11, 2018

(54) MANIFOLD INTEGRATED INTERCOOLER WITH STRUCTURAL CORE

(71) Applicant: Hanon Systems, Daejeon (KR)

(72) Inventors: Leo Somhorst, Chislehurst (GB); James Grainger, London (GB); Petr Fabian, Studenka (CZ); A-Ra Jo, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/593,670

(22) Filed: May 12, 2017

(65) Prior Publication Data

US 2017/0335746 A1 Nov. 23, 2017

Related U.S. Application Data

(60) Provisional application No. 62/338,740, filed on May 19, 2016.

(51) Int. Cl.
| | | |
|---|---|---|
| *F01P 3/18* | (2006.01) | |
| *F28F 9/00* | (2006.01) | |
| *F02M 31/20* | (2006.01) | |
| *F28D 9/00* | (2006.01) | |
| *F28F 3/12* | (2006.01) | |
| *F28F 9/02* | (2006.01) | |
| *F02B 29/04* | (2006.01) | |

(Continued)

(52) U.S. Cl.
CPC .............. *F01P 3/18* (2013.01); *F02B 29/04* (2013.01); *F02M 31/20* (2013.01); *F28D 9/0056* (2013.01); *F28F 3/12* (2013.01); *F28F 9/001* (2013.01); *F28F 9/0219* (2013.01); *F28F 9/0226* (2013.01); *F28F 13/12* (2013.01); *F28D 2021/0082* (2013.01)

(58) Field of Classification Search
CPC .......... F28D 2021/0082; F28D 9/0056; F28D 1/0366; F28D 1/05366; F28D 2021/008; F02B 29/0475; F28F 9/001; F28F 9/0224; F28F 9/0075; F28F 9/02
See application file for complete search history.

(56) References Cited

U.S. PATENT DOCUMENTS

| | | | | |
|---|---|---|---|---|
| 4,436,145 A | * | 3/1984 | Manfredo | F02B 29/0456 123/563 |
| 6,427,639 B1 | * | 8/2002 | Andrews | B01D 53/9454 123/3 |

(Continued)

FOREIGN PATENT DOCUMENTS

| | | |
|---|---|---|
| CZ | 20120944 A3 | 7/2014 |
| KR | 20090106479 A | 10/2009 |
| KR | 20120024184 A | 3/2012 |

*Primary Examiner* — Long T Tran
(74) *Attorney, Agent, or Firm* — Shumaker, Loop & Kendrick, LLP; James D. Miller

(57) ABSTRACT

A heat exchanger for a vehicle includes an inlet tank configured to receive air from an air circuit of the vehicle. The heat exchanger further includes a heat exchange assembly disposed intermediate the inlet tank and an outlet tank. The heat exchange assembly exchanging heat between the air and a coolant. The outlet tank is configured to directly couple to an engine block of the vehicle and convey the air to the engine block. The outlet tank has at least two openings formed therein. The openings are configured to communicate with corresponding cylinders of the engine block of the vehicle.

17 Claims, 3 Drawing Sheets

(51) Int. Cl.
*F28F 13/12* (2006.01)
*F28D 21/00* (2006.01)

(56) References Cited

U.S. PATENT DOCUMENTS

| | | | | |
|---|---|---|---|---|
| 8,671,919 | B2* | 3/2014 | Nakasugi | F02B 29/0437 |
| | | | | 123/542 |
| 9,605,586 | B2* | 3/2017 | Saumweber | F02B 29/0462 |
| 2010/0089548 | A1 | 4/2010 | Braic et al. | |
| 2010/0199663 | A1 | 8/2010 | Marimbordes et al. | |
| 2012/0292002 | A1* | 11/2012 | Saumweber | F02B 29/0462 |
| | | | | 165/164 |
| 2013/0213621 | A1 | 8/2013 | Pierre et al. | |
| 2013/0284395 | A1* | 10/2013 | Kamoshida | F28D 20/00 |
| | | | | 165/10 |
| 2014/0231054 | A1* | 8/2014 | Martins | F02B 29/0462 |
| | | | | 165/166 |
| 2014/0251579 | A1* | 9/2014 | Sloss | F01N 5/02 |
| | | | | 165/96 |
| 2014/0311143 | A1* | 10/2014 | Speidel | F02B 37/00 |
| | | | | 60/599 |
| 2014/0345577 | A1* | 11/2014 | Meshenky | F02M 35/112 |
| | | | | 123/542 |
| 2016/0025418 | A1 | 1/2016 | Devedeux et al. | |

\* cited by examiner

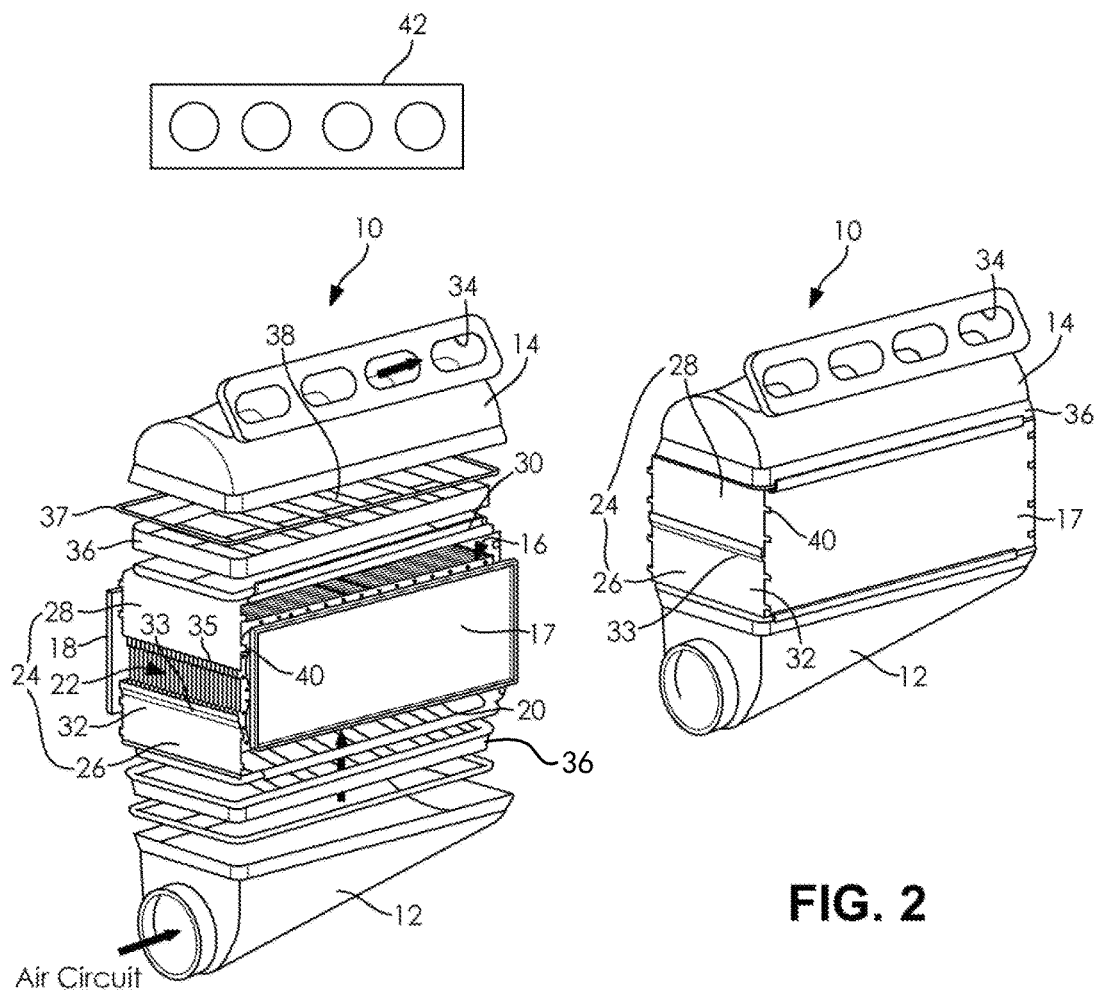

MANIFOLD INTEGRATED INTERCOOLER WITH STRUCTURAL CORE

CROSS-REFERENCE TO RELATED PATENT APPLICATION

This patent application claims the benefit of U.S. Provisional Patent Application Ser. No. 62/338,740, filed on May 19, 2016. The entire disclosure of the above patent application is hereby incorporated herein by reference.

FIELD OF THE INVENTION

The invention relates to a heat exchanger for a motor vehicle, and more particularly, to a manifold integrated cooler configured to mount to an engine block of the motor vehicle.

BACKGROUND

As is commonly known, it is desirable for air entering an engine of a motor vehicle to be cooled, especially after exiting a turbocharger or a supercharger, because cooler air will have an increased density that maximizes an efficiency of the engine. In certain situations, the cooling of the air may also facilitate engine management and eliminate pre-detonation of the air and a fuel prior to a timed spark ignition. Additionally, the cooling of the air militates against excessive wear or heat damage to an engine block of the engine.

Heat exchangers such as water-cooled charge air coolers (WCAC) can be used in the motor vehicle to cool the air that has been compressed by the turbocharger or the supercharger prior to entering the engine. Typically, for application specific needs such as space constraints in a vehicle, for example, WCACs utilize a coolant from one or more sources and may include a heat exchange core with plates having multi-pass configurations.

In certain applications, it may be desirable to mount the WCAC within a manifold of the engine or directly to the engine block. However, to achieve vibration goals and cost savings, it is advantageous to continually improve heat exchangers and WCACs.

Accordingly, there exists a need in the art for mounting an outlet tank of a heat exchanger directly to an engine block of a motor vehicle while maintaining a structural integrity and minimizing a manufacturing cost thereof.

SUMMARY OF THE INVENTION

In concordance with the instant disclosure, an improved means of mounting an outlet tank of a heat exchanger directly to an engine block of a motor vehicle while maintaining a structural integrity and minimizing a manufacturing cost thereof is discovered.

According to a first embodiment of the disclosure, a heat exchanger for a motor vehicle is disclosed. The heat exchanger includes an inlet tank configured to receive air from an air circuit of the vehicle. The heat exchanger further includes a heat exchange assembly disposed intermediate the inlet tank and an outlet tank. The heat exchange assembly exchanges heat between the air and a coolant. The outlet tank is configured to directly couple to an engine block of the motor vehicle and convey the air to the engine block. The outlet tank has at least two openings formed therein. The openings are configured to communicate air with corresponding cylinders of the engine block of the motor vehicle.

According to another embodiment of the disclosure, an engine block and heat exchanger assembly for a motor vehicle is disclosed. The assembly includes an engine block including a plurality of cylinders and an inlet tank configured to receive air from an air circuit of the motor vehicle. The assembly further includes a heat exchange assembly having a plurality of plate assemblies having multi-pass flow channels receiving a coolant therein. The heat exchange assembly exchanges heat between the air and the coolant. The heat exchange assembly configured to be directly coupled to the engine block and providing fluid communication between the heat exchange assembly and the plurality of cylinders of the engine block. The heat exchange assembly disposed intermediate the inlet tank and the engine block.

According to yet another embodiment of the disclosure, an engine block and heat exchanger assembly of a vehicle is disclosed. The assembly includes an engine block including a plurality of cylinders and a heat exchanger directly mounted to the engine block. The heat exchanger includes an inlet tank receiving air from an air circuit of the vehicle and an outlet tank conveying the air to the engine block. A heat exchange assembly exchanges heat between the air and a coolant and is disposed intermediate the inlet tank and the outlet tank. A header is disposed intermediate the heat exchange assembly and the outlet tank. The outlet tank includes a plurality of outlet openings. The plurality of outlet openings correspond with corresponding ones of the plurality of cylinders of the engine block. The header includes a plurality of support members extending between inner surfaces thereof.

BRIEF DESCRIPTION OF THE DRAWINGS

FIG. 1 is a partially exploded perspective view of a heat exchanger according to an embodiment of the disclosure;

FIG. 2 is an assembled perspective view of the heat exchanger of FIG. 1;

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical. As used herein, the term "substantially" means "mostly, but not perfectly" or "approximately" as a person skilled in the art would recognize in view of the specification and drawings.

Figure 3:
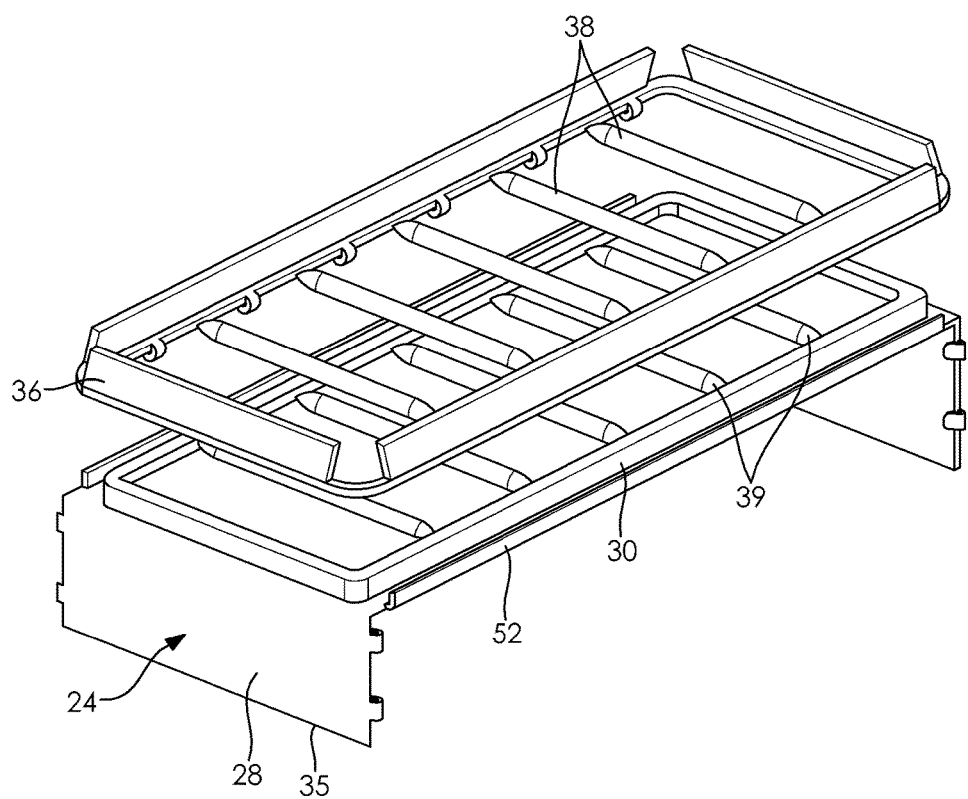
FIG. 3 is an enlarged exploded perspective view of a header and a portion of a panel assembly of the heat exchanger of FIGS. 1-2.

FIGS. 1-3 illustrate a heat exchanger 10 according to an embodiment of the disclosure. As illustrated, the heat exchanger 10 is configured as an intercooler such as a water-cooled charge air cooler, for example. However, it is understood the heat exchanger 10 can be configured as any type of heat exchanger commonly employed in motor vehicle systems such as used for a air-cooled charge air cooler, a tube-type heat exchanger, a radiator, an oil cooler, or other heat exchanger now known or later developed.

The heat exchanger 10 includes an inlet tank 12 and an outlet tank 14 for respectively receiving and conveying air flowing from an air circuit of a motor vehicle. A direction of a flow of the air through the heat exchanger 10 is indicated by the arrows. The heat exchanger 10 further includes a heat exchange assembly 16 configured to transfer heat between the air flowing through the heat exchanger 10 and the heat exchange assembly 16. The heat exchange assembly 16 is disposed between a first cover 17 and a second cover 18 opposing each other with respect to a direction substantially perpendicular to a direction of the flow of the air through the heat exchanger 10. The heat exchange assembly 16 and the covers 16, 17 are disposed intermediate the inlet tank 12 and the outlet tank 14.

The heat exchange assembly 16 has opposing open ends 20. Each of the open ends 20 is configured to provide fluid communication into the heat exchange assembly 16 and out of the heat exchange assembly 16, respectively, wherein fluid enters the heat exchange assembly 16 through a first one of the open ends 20 and exits the heat exchange assembly 16 through a second one of the open ends 20. The heat exchanger 10 can also include other components such as additional conduits, connections, tanks, valves, and other components commonly used with a heat exchanger, as desired.

The heat exchange assembly 16 includes a plurality of stacked, substantially parallel plate assemblies 22. The plate assemblies 22 can be interposed between a plurality of substantially parallel fins (not shown), if desired. Each of the plate assemblies 22 defines at least one flow channel 23, shown in FIG. 4, for receiving a coolant from at least one coolant source. As illustrated, each of the plate assemblies 22 can be configured for multi-pass fluid flow, wherein the plate assemblies 22 define parallel pass flow channels 23.

Figure 4:
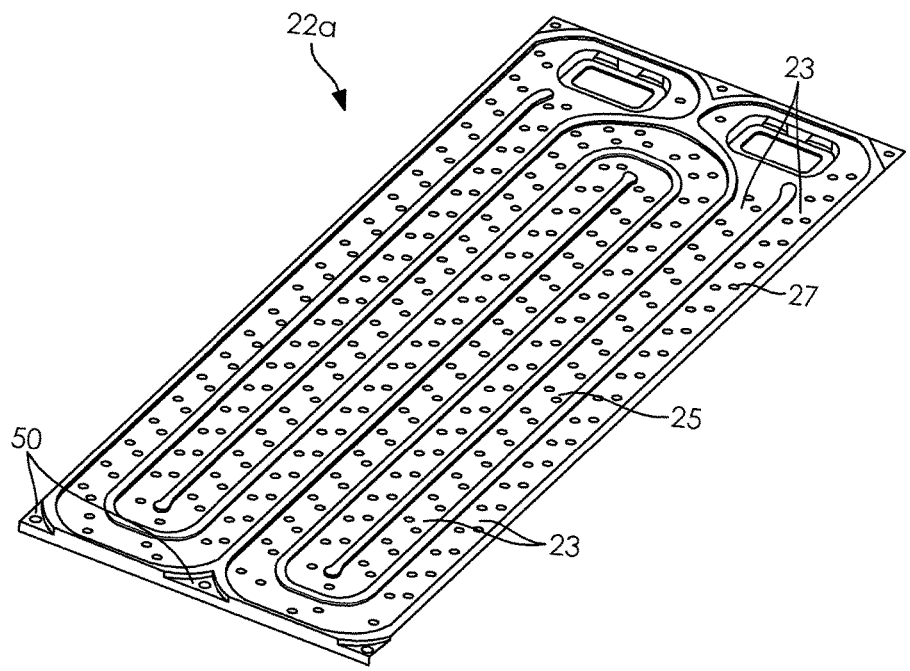
FIG. 4 is an enlarged top perspective view of a plate of a heat exchange assembly of the heat exchanger of FIGS. 1-2.
Figure 5:
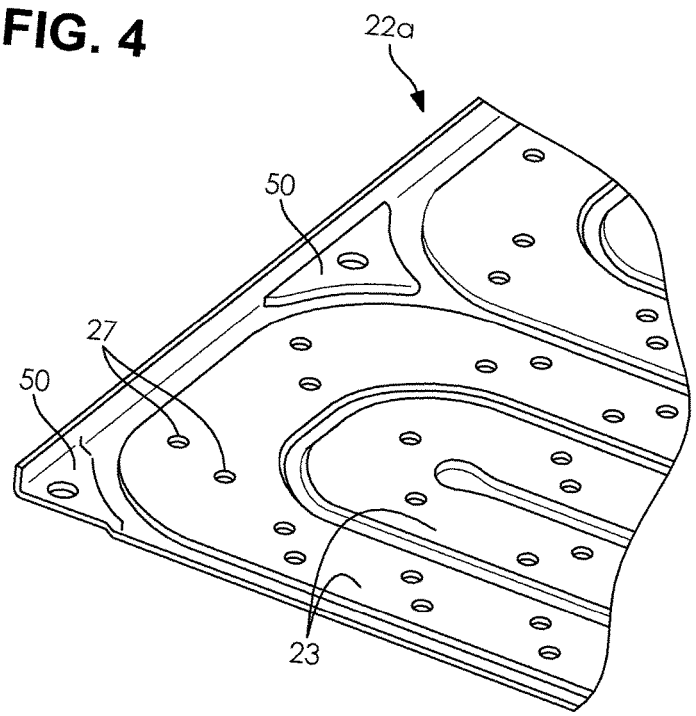
FIG. 5 is an enlarged fragmentary bottom perspective view of the plate of FIG. 3.

Each of the plate assemblies 22 includes a plate 22a, as illustrated in FIGS. 4-5. Each of the plates 22a cooperates with an opposing plate to form the flow channels 23. As shown, each surface of the plate 22a includes a first area and a second area having dual serpentine multi-pass flow channels 23, wherein the coolant flows through the flow channels 23 between fluid openings 25. The flow channels 23 can include turbulent flow features 27 such as protrusions or recesses formed on a surface of the flow channels 23. However, the turbulent flow features 27 can be ridges, surface roughening, or any other feature to effect a turbulence or cause a turbulent flow of the coolant flowing through the flow channels 23. It is understood, alternate plate configurations can be contemplated without departing from the instant disclosure. For example, each of the plates 22a can have channels 23 with single serpentine flow path or more than two multi-pass channels 23, for example.

Each of the plates 22a further include raised area 50 formed adjacent opposing ends of the plate 22a. In the example illustrated, the raised area 50 are disposed as each corner of the plate 22a and at portion intermediate each corner of the plate 22a. The raised areas 50 provide a contact area for brazing the fins to the plates 22a.

With renewed reference to FIGS. 1-3, in certain embodiments, the heat exchanger 10 further includes a header 36 and a seal 37 disposed between the heat exchange assembly 16 and each of the inlet tank 12 and the outlet tank 14. The header 36 and the seal 37 cooperate to facilitate coupling the heat exchange assembly 16 to each of the inlet tank 12 and the outlet tank 14 and to militate against air leaking from the heat exchanger 10. The seal 37 is disposed along a perimeter of the header 36 and engages a shoulder formed at a perimeter of each of the respective outlet tank 14 and the inlet tank 12. The header 36 can be configured as any header commonly employed with heat exchangers such as shown in described in U.S. patent application Ser. No. 15/155,395, hereby incorporated by reference herein in its entirety.

In the embodiment illustrated, a panel assembly 24 is configured to enclose sides of the heat exchange assembly 16. The panel assembly 24 includes a first portion 26 and a second portion 28. Each of the portions 26, 28 has a frame 30 and a pair of panels 32. The frame 30 of the first portion 26 is disposed intermediate the inlet tank 12 and the heat exchange assembly 16 and the frame 30 of the second portion 28 is disposed intermediate the outlet tank 14 and the heat exchange assembly 16. The frame 30 defines an open portion and extends along a perimeter of the heat exchange assembly 16. The panels 32 extend laterally outwardly from the frame 30 substantially perpendicular to the frame 30. The panels 32 are configured to cover the open sides of the heat exchange assembly 16 and cooperate with the covers 17, 18 to enclose the heat exchange assembly 16, except for the open ends 20.

The panels 32 of the frame 30 of the first portion 26 can have a shoulder 33 formed at an end thereof. A lip or edge 35 of the panels 32 engage the shoulder of the panels 32 of the first portion 26. However, if desired, the panels 32 of the first portion 26 can have an edge configured to engage with shoulder 33 of the panels 32 of the second portion 28. Other engaging structures can be used without departing from the scope of the invention. In the embodiment illustrated, the panels 32 of the first portion 26 cooperate with the panels 32 of the second portion 28 to entirely enclose the sides of the heat exchange assembly 16. However, it is understood the panels 32 can extend partially over the heat exchange assembly 16 and expose at least a portion of the heat exchange assembly 16, if desired. Attachment features 40 can be included on the panels 32 to engage with the first cover 17 and the second cover 18 to secure the panel assembly 24 to the covers 17, 18. Additional covers and/or housings can be employed to contain and protect the heat exchange assembly 16, as desired.

Each of the portions 26, 28 of the panel assembly 24 can include a pair of elongate flanges 52 extending lengthwise along the side of the frame 30 spaced from the frame 30. The flanges 52 extending substantially parallel to walls forming the frame 30. The flanges 52 cooperate with the frame 30 to form a slot for receiving the respective header 36. The flanges 52 cooperate with the frame to engage and support the respective header 36.

The outlet tank 14 includes a plenum with at least two outlet openings 34. In the embodiment illustrated, the outlet tank 14 includes four outlet openings 34 configured to correspond to cylinders in an engine block 42 of the vehicle. The outlet openings 34 align with or provide fluid communication to corresponding ones of the cylinders in the engine block 42 to facilitate conveying air through the air system of the vehicle. However, according to other embodiments, the outlet tank 14 can include more or fewer outlet openings 34 for alternate arrangements of the engine block 42 or depending on the number of cylinders in the engine block 42. The outlet tank 14 is configured to be directly mounted to the engine block 42. In another exemplary embodiment, the heat exchange assembly 10 does not include the outlet tank 14. The heat exchange assembly 10 is directly coupled or mounted to the engine block 42.

The header 36 is a frame and can include elongate support members 38 extending between sides or inner surfaces of the header 36. The support members 38 structurally support the integrity of the header 36 by adding rigidity to the header 36 such as when the header 36 is submitted to vibrations and pressure loads or during a during the manufacturing process forming the header 36, for example. In the embodiment illustrated, there are five support members 38. However, there can be more or fewer support members 38, if desired. Additionally, the portions 26, 28 of the panel assembly 24 can include support members 39 extending between sides of the frame 30 to support the integrity of the panel assembly 24 and add rigidity to the panel assembly 24 such as when the panel assembly 24 is submitted to vibrations and pressure loads, for example. The headers 36 are coupled to the respective inlet tank 12 and outlet tank 14 as well as the heat exchange assembly 16 by coupling means such as a crimping method, bolts, weld, or any other coupling means, as desired.

It is understood the heat exchanger 10 can include other configurations and features without departing from the scope of the instant disclosure. For example, the heat exchanger 10 can include features as shown and described in Czech Republic Pat. Appl. Pub. No. CZ20120944 and U.S. Pat. Appl. Pub. No. 2013/0213621, both of which are hereby incorporated herein with reference in their entirety. To assemble, the covers 17,18 and the panel assembly 24 partially cover the heat exchange assembly 16 and are disposed intermediate the headers 36. The seals 37 are disposed intermediate the headers 36 and the inlet tank 12 and outlet tank 14, respectively. In application, the air from the air circuit flows through the inlet tank 12 and through the heat exchange assembly 16 to the outlet tank 14. As the air is conveyed through the heat exchange assembly 16, the coolant flowing through the channels 23 of the plate assemblies 22 exchanges heat with the air flowing through the heat exchange assembly 16 and cools the air. The cooled air flows through the outlet tank 14 to the cylinders of the engine block 42.

Advantageously, the heat exchanger 10 of the present disclosure can be employed in applications with high vibration and pressure loads due to the maximized rigidity. The heat exchanger 10 also minimizes manufacturing and assembly costs, meets package size requirements, and minimizes an air pressure drop of charged air.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A heat exchanger for a motor vehicle comprising:
an inlet tank configured to receive air from an air circuit of the motor vehicle;
a heat exchange assembly exchanging heat between the air and a coolant;
an outlet tank configured to directly couple to an engine block of the motor vehicle and convey the air to the engine block, the outlet tank having at least two openings formed therein, each of the openings configured to communicate with corresponding cylinders of the engine block of the motor vehicle, the heat exchange assembly disposed intermediate the inlet tank and the outlet tank;
a first header disposed intermediate the heat exchange assembly and the inlet tank; and
a second header disposed intermediate the outlet tank and the heat exchange assembly.

2. The heat exchanger of claim 1, further comprising a first seal disposed intermediate the first header and the inlet tank and a second seal disposed intermediate the second header and the outlet tank.

3. The heat exchanger of claim 1, wherein each of the first header and the second header is a frame including a plurality of support members extending between inner surfaces of the frame of each of the first header and the second header.

4. The heat exchanger of claim 1, wherein the heat exchange assembly includes a plurality of plate assemblies cooperating to define flow channels therebetween configured to convey the coolant therethrough.

5. The heat exchanger of claim 4, wherein the flow channels are serpentine and form a multi-pass configuration.

6. The heat exchanger of claim 4, wherein each of the plate assemblies includes a pair of plates, each of the pair of plates includes raised areas formed at opposing ends thereof configured to support fins positioned between adjacent ones of the plurality of the plate assemblies.

7. The heat exchanger of claim 1, further comprising a pair of cover plates cooperating with a panel assembly to at least partially cover sides of the heat exchange assembly and define open ends conveying the air to and from the heat exchange assembly.

8. The heat exchanger of claim 7, wherein the panel assembly includes a first portion and a second portion, each of the first portion and the second portion having a frame and a pair of panels extending laterally outwardly from the frame.

9. The heat exchanger of claim 8, wherein each of the first portion and the second portion includes a plurality of support members extending between inner surfaces of the frame.

10. The heat exchanger of claim 8, wherein each of the first portion and the second portion include a pair of flanges formed lengthwise thereon configured to receive and support a header.

11. An engine block and heat exchanger assembly for a motor vehicle comprising:
an engine block including a plurality of cylinders;
an inlet tank configured to receive air from an air circuit of the motor vehicle;
a heat exchange assembly including a plurality of plate assemblies having one of singular and multi-pass flow channels receiving a coolant therein, the heat exchange assembly exchanging heat between the air and the coolant; the heat exchange assembly configured to be directly coupled to the engine block and providing fluid communication between the heat exchange assembly and the plurality of cylinders of the engine block, the heat exchange assembly disposed intermediate the inlet tank and the engine block; and
a header disposed intermediate the heat exchange assembly and the inlet tank.

12. The heat exchanger of claim 11, further comprising a seal disposed intermediate the header and the inlet tank.

13. The heat exchanger of claim 11, wherein the header is a frame including a plurality of support members extending between inner surfaces of the frame.

14. The heat exchanger of claim 11, further comprising a pair of cover plates cooperating with a panel assembly to at least partially cover sides of the heat exchange assembly and define open ends for conveying the air to and from the heat exchange assembly, wherein the panel assembly includes a first portion and a second portion, each of the first portion and the second portion having a frame, a pair of panels extending laterally outwardly from the frame, and a pair of flanges extending in a lengthwise direction with respect to the frame.

15. The heat exchanger of claim 14, wherein each of the first portion and the second portion includes a plurality of support members extending between inner surfaces of the frame.

16. An engine block and heat exchanger assembly of a vehicle comprising:
   an engine block including a plurality of cylinders; and
   a heat exchanger directly mounted to the engine block, the heat exchanger including an inlet tank receiving air from an air circuit of the vehicle, an outlet tank conveying the air to the engine block, a heat exchange assembly exchanging heat between the air and a coolant disposed intermediate the inlet tank and the outlet tank, and a first header disposed intermediate the heat exchange assembly and the inlet tank and a second header disposed intermediate the heat exchange assembly and the outlet tank, the outlet tank including a plurality of outlet openings, the plurality of outlet openings communicating with corresponding one of the plurality of cylinders of the engine block, and the first and second headers including a plurality of support members extending between inner surfaces thereof.

17. The engine block and heat exchanger assembly of claim 16, wherein the heat exchange assembly includes a plurality of plate assemblies defining one of singular and multi-pass serpentine flow channels configured to receive a coolant therein.

* * * * *